United States Patent [19]

Yasuda

[11] Patent Number: 5,783,334
[45] Date of Patent: Jul. 21, 1998

[54] METHOD FOR PRODUCING LITHIUM NICKELATE POSITIVE ELECTRODE AND LITHIUM BATTERY USING THE SAME

[75] Inventor: Hideo Yasuda, Kyoto, Japan

[73] Assignee: Japan Storage Battery Co., Ltd., Kyoto, Japan

[21] Appl. No.: 831,520

[22] Filed: Apr. 1, 1997

[30] Foreign Application Priority Data

Apr. 1, 1996 [JP] Japan ................................. 8-104694

[51] Int. Cl.$^6$ ................................................. H01M 4/02
[52] U.S. Cl. ......................... 429/223; 423/594; 423/599
[58] Field of Search ............................... 424/218, 223; 423/594, 599; 24/623.1

[56] References Cited

U.S. PATENT DOCUMENTS

4,980,080  12/1990  Lacerf et al. ........................ 252/182.1

FOREIGN PATENT DOCUMENTS

| 2096264 | 11/1994 | Canada . |
| A1 0 345 707 | 12/1989 | European Pat. Off. . |
| 0 573 040 | 12/1993 | European Pat. Off. . |
| A1 0 624 552 | 11/1994 | European Pat. Off. . |
| 0 701 293 | 3/1996 | European Pat. Off. . |
| 55-64372 | 5/1980 | Japan . |
| 63-19760 | 1/1988 | Japan . |
| 63-19761 | 1/1988 | Japan . |
| 6-310145 | 11/1994 | Japan . |
| 6-349494 | 12/1994 | Japan . |
| 8-306360 | 11/1996 | Japan . |

OTHER PUBLICATIONS

"Study of the Properties of the Nickel Oxide Electrode III. Behavior of the Higher Nickel Oxides in LiOH Solution"; Uflyand et al., Elektrokhimiya, vol. 6, No. 9, pp. 1312–1317, Sep., 1970.

"Influence of Cobalt Addition on the Performance of Sintered Nickel Hydroxide Positive Plates in Various Alkali Hydroxide Solutions"; Yasuda et al., GS News Technical Report, vol. 37, No. 2, Nov. 1978, pp. 18–23.

"The Nickel Positive Electrode II. Semiconductor and Electrode Performance"; Tuomi et al., J. Electrochem, vol. 115, No. 5, pp. 450–451 (month n/a).

"Structure and Electrochemistry of $L_{1\pm y}NiO_2$ and a New $Li_2NiO_2$ Phase with the $Ni(OH)_2$ Structure"; Dahn et al.; Solid State Ionics 44 (1990) 87–97 North Holland; Jun. 9, 1990.

"New Route to Prepare $LiNiO_2$ For 4-Volts Secondary Lithium Cells"; Ohzuku et al.; Chemistry Express, vol. 7, No. 9, pp. 689–692 (1992). (month n/a).

"Synthesis and Characterization of $LiNiO_2$ as a Cathode Material for Secondary Lithium Battery"; Arai et al.; 33rd Battery Symposium in Japan Summary, pp. 21–22 (1992), (month n/a).

"Electrochemistry and Structural Chemistry if $LiNiO_2$ (R3m) for 4 Volt Secondary Lithium Cells"; Ohzuku et al.; J. Electrochem. Soc., vol. 140, No. 7, Jul. 1993.

"The $LiNiO_2$/Carbon Lithium–Ion Battery"; Ebner et al.; Solid State Ionics 69 (1994); pp. 238–256 (month N/A).

"Structure and Electrochemistry of $Li_xMn_yNi_{1-y}O_2$", Rossen et al.; Solid State Ionics 57 (1992) pp. 311–318, North Holland (month N/A).

"Synthesis and Characterization of $LiNiO_2(R3m)$ for Rechargeable Nonaqueous Cells"; Ohzuku et al., Chemistry Express, vol. 6, No. 3, pp. 161–164 (1991), (Month N/A).

(List continued on next page.)

*Primary Examiner*—M. Nuzzolillo
*Attorney, Agent, or Firm*—Sughrue, Mion, Zinn, Macpeak & Seas, PLLC

[57] ABSTRACT

In a method for producing a lithium nickelate positive electrode, nickel hydroxide or nickel oxyhydroxide is held into an electrically conductive porous substrate to form an electrode plate, the electrode is treated with an alkaline solution containing lithium ion; and the electrode treated with the alkaline solution is heated at a temperature not higher than 450° C.

28 Claims, 1 Drawing Sheet

OTHER PUBLICATIONS

"Electrochemical and Physical Properties of the $Li_xNi_{1-y}Co_yO_2$ Phases"; Delmas et al.; Solid State Ionics 53–56 (1992) 370–375, North Holland (Month N/A).

Patent Abstracts of Japan, vol. 005, No. 133 (E–071), Aug. 25, 1981 & JP 56 071276 A (Toshiba Corp), Jun. 13, 1981, *Abstract.

Patent Abstracts of Japan, vol. 018, No. 540 (E–1616), Oct. 14, 1994 & JP 06 196161 A (Sanyo Electric Co., Ltd.), Jul. 15, 1994, *Abstract.

METHOD FOR PRODUCING LITHIUM NICKELATE POSITIVE ELECTRODE AND LITHIUM BATTERY USING THE SAME

BACKGROUND OF THE INVENTION

1. Field of the Invention

The present invention relates to a method for producing lithium nickelate positive electrode, and a lithium battery using the same.

2. Description of the Related Art

Recently, a novel high-performance battery has been expected to appear with the development of electronic appliances. At present, for electric sources of electronic appliances, a manganese dioxide-zinc battery is used as a primary battery, and a nickel battery system such as a nickel-cadmium battery, a nickel-zinc battery or a nickel-metal hydride battery or a lead battery is used as a second battery. An alkaline aqueous solution such as potassium hydroxide and an aqueous solution such as sulfuric acid are used as electrolytes for these batteries.

The development of batteries using non-aqueous electrolytes as higher energy density batteries has been advanced recently in place of those aqueous solution type batteries. A typical example of the batteries is a lithium battery using lithium in a negative electrode.

For example, there are a manganese dioxide-lithium battery, carbon fluoride-lithium battery and the like as primary batteries, and there are a manganese dioxide-lithium battery, a vanadium oxide-lithium battery and the like as secondary batteries.

In secondary batteries using metal lithium as a negative electrode, there is such a disadvantage that the batteries are short in life because dendritic growth of metal lithium is apt to cause short-circuiting. Furthermore, it is difficult to secure safety because metal lithium is highly reactive. Therefore, so-called lithium ion battery using graphite or carbon as a negative active material and lithium cobaltate as a positive have been proposed as a high capacity battery so as to be used as a high energy density battery.

However, because lithium cobaltate is expensive, lithium-containing manganese composite oxide or lithium nickelate has been proposed as a substitute for lithium cobaltate. In the case of using lithium-containing manganese composite oxide, there is such a problem that theoretical capacity and density is low and the delivered capacity decreases greatly as the charging/discharging cycle is repeated.

On the other hand, although lithium nickelate (lithium-containing nickel oxide) has the same crystalline structure as lithium cobaltate which is put into practical use, there is such a problem in the lithium nickelate that the capacity is reduced because its structure is similar to a rock salt structure. Accordingly, nickel and lithium ions are replaced by each other easily to form an asymmetric structure as reported by Solid State Ionics, 44, 87, 1990; Chem. Express, 7, 689, 1992; and the 33rd Battery Symposium in Japan Summary p.21 (1992).

With respect to a producing method to solve this problem, for example, J. Electrochem. Soc., 140, 1862, 1993 has proposed to use $Ni(NO_3)_2$, $Ni(OH)_2$ and $NiCO_3$ as basic materials for nickel and LiOH, $LiNO_3$ and $Li_2CO_3$ as lithium sources and to perform heating at a temperature of from 750° C. to 900° C. Chem. Express, 7, 689, 1992 has proposed that $NiCO_3$ and $LiNO_3$ are pressurized to form a pellet and the pellet is heated at 750° C. in an oxygen flow to perform synthesis. European Patent No. 0345707 and U.S. Pat. No. 4,980,080 have proposed that a mixture of NiO and LiOH is heated at 700° C. In addition, Solid State Ionics, 69, 238, 1994 has proposed that $Ni(OH)_2$ and LiOH are heated at 650° C.

In addition to the above means for improving producing conditions, it has been proposed to attempt to replace a part of nickel by other elements in order to attain stability of lithium nickelate. For example, Solid State Ionics, 57, 311, 1992 has proposed that a part of nickel is replaced by manganese. Chem. Express, 6, 161, 1991 has proposed that a part of nickel is replaced by cobalt and, cobalt-containing lithium nickelate $LiNi_{1-x}Co_xO_2$ ($0 \leq x \leq 0.5$) is obtained by mixing aqueous solutions of $Ni(NO_3)_2$, $Co(NO_3)_2$ and LiOH; preparatorily drying the mixture at 90° C.; and heating the mixture at 800° C. in air. Solid State Ionics, 53–56, 370, 1992 has proposed to heat $Li_2CO_3$, NiO and $Co_3O_4$ at a temperature of from 800° C. to 1000° C. under an oxygen atmosphere.

Further, nickel oxyhydroxide has been attempted to be used. Japanese Patent Unexamined Publication (kokai) No. Sho. 63-19760 has proposed to use nickel oxyhydroxide containing 20% to 75% of cobalt as an active material for a lithium battery. Japanese Patent Unexamined Publication (kokai) No. Sho. 63-19761 has proposed to use a material obtained by charging nickel hydroxide in a lithium hydroxide solution as an active material.

In addition, Japanese Patent Unexamined Publication (kokai) No. Hei. 6-310145 has proposed a process of mixing hydroxide or oxide containing trivalent nickel ions with lithium salt and then heating the mixture to thereby improve discharging characteristic. According to this Publication, lithium nickelate is produced by the following method. Lithium nitrate is mixed with hydroxide or oxide containing nickel oxyhydroxide produced by reacting a sodium hypochlorite aqueous solution, a chlorine-containing aqueous solution or a bromine-containing aqueous solution in a sodium hydroxide solution containing dispersed divalent nickel hydroxide ($Ni(OH)_2$). The mixture is pressurized, formed and dried, and then the mixture is heated in air at a temperature of from 600° C. to 800° C. Thereafter, the mixture is pulverized to form the mixture again, and the mixture is heated at a temperature of from 700° C. to 900° C. in air to thereby produce the lithium nickelate.

However, this lithium nickelate has such a serious disadvantage that, in addition to the difficulty in producing purified lithium nickelate, the voltage of charging/discharging characteristic changes multistageously, for example, in four stages, and moreover, its high rate discharge performance is lowered.

As proposed in Japanese Patent Unexamined Publication (Kokai) No. Hei-8-306360, recently, there is such a proposal of the reaction of lithium nitrate with cobalt-containing nickel oxyhydroxide to synthesize lithium nickelate exhibiting a uniform charging/discharging reaction. Even if an active material produced by any one of these methods is used, in order to produce a lithium nickelate positive electrode, the active material must be pulverized into fine powder and then mixed with an electrically conductive material such as carbon or the like. Thereafter, the mixture together with a binding agent such as polyvinylidene fluoride or the like is applied onto a metal current collector such as an aluminum current collector or a nickel current collector. Accordingly, there is such a problem that not only the producing process is complex but also the performance greatly depends on the amounts of the carbon powder and the binding agent.

Further, although Japanese Patent Unexamined Publication (kokai) No. Hei. 6-349494, European Patent No. 0624552 and Canadian Patent No. 2096264 have proposed that $LiMnO_2$ is generated by an ion-exchange reaction so as to be used as an active material for a battery and have described that $LiNiO_2$ can be produced in the same manner, those publications do not describe about a specific method for synthesizing $LiNiO_2$. Further, Soviet Electrochem., 6.1268, 1970 and GS News 37, 84(1978) describes that $LiNiO_2$ is generated by an electrochemical method. Further, J. Electrochem., 115, 450(1968) suggests that $LiNiO_2$ generated by an electrochemical method is based on an ion-exchange reaction but does not mention the application of it to non-aqueous solution lithium batteries.

Accordingly, a method for synthesizing an active material having stabler performance and a producing method in which the electrode producing process can be simplified have been required.

Because lithium nickelate has such a serious disadvantage that the voltage in charging/discharging characteristic changes multistageously and, accordingly, the capacity is reduced with the repetition of the charging/discharging cycle in addition to the difficulty in producing purified lithium nickelate as described above, lithium nickelate has not been used as a substitute for lithium cobaltate having the same layer structure.

From the point of view of electrode reaction, this is presumed to be caused by the fact that lithium ions in lithium nickelate are hardly diffused in the charging/discharging process, and that the diffusion of lithium ions is not made homogeneously.

In addition, the fact that a method for synthesizing lithium nickelate having a uniform structure or having a large surface area and an optimum electrode structure concerning an active material and a current collector are not established is one of causes.

SUMMARY OF THE INVENTION

Therefore, the present invention has been accomplished to solve the aforementioned problems, and it is an object of the present invention to provide a method for producing a high-performance lithium nickelate positive electrode in which the contact condition between a current collector and an active material and the contact condition between active materials are good so that an electrode reaction is performed homogeneously.

Furthermore, it is demanded to establish a method for producing an economically excellent lithium nickelate positive electrode in which no complex process is required in an electrode producing process.

In a method for producing a lithium nickelate positive electrode according to the present invention, nickel hydroxide or nickel oxyhydroxide is held into an electrically conductive porous substrate, the electrode is treated with an alkaline solution containing lithium ion; and the electrode treated with the alkaline solution is heated preferably at a temperature not higher than 450° C. but not lower than 50° C.

A lithium battery according to the present invention is a battery produced by the above method.

A lithium battery having a positive electrode produced by the method according to the present invention is not required a conventional method for producing a lithium nickelate positive electrode in which lithium nickelate is once synthesized before lithium nickelate is applied onto a current collector or filled in a porous material of the current collector, but the electrically conductive substrate is directly filled with the raw material. Accordingly, the electrical contact between the active material and the current collector is good. Furthermore, the adhesion condition between lithium nickelate particles as the active material is good. Therefore, not only the contact resistance between particles is small but also the diffusion of lithium ions which is the rate determining process is made easy homogeneously between particles. Consequently, a positive electrode having very high performance can be produced and provided.

Furthermore, because not only the electrode producing process can be simplified compared with the conventional process but also synthesis can be made under a low temperature not higher than 450° C., an economically excellent, inexpensive, positive electrode can be provided.

DETAILED DESCRIPTION OF THE INVENTION

Figure 1:
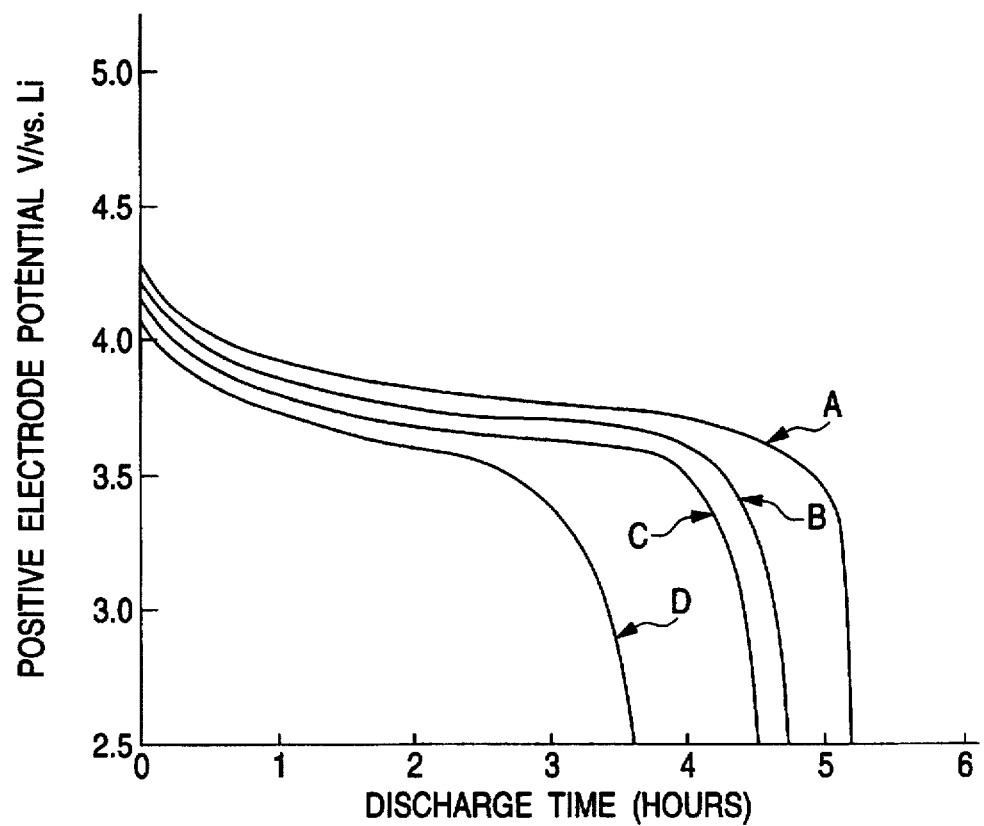
FIG. 1 is a graph showing discharging characteristic in comparison between a positive electrode according to the present invention and a conventional positive electrode.

Detailed description of the present invention will be described as follows referring to the accompanying drawings.

In order to solve the conventional problems, in a method for producing a lithium nickelate positive electrode according to the present invention, after holding nickel hydroxide or nickel oxyhydroxide in an electrically conductive porous material, the porous material holding the nickel hydroxide is treated with an alkaline solution containing lithium ions and subsequently, the porous material is heated. The electric ally conductive porous material is formed from nickel, carbon, aluminum or stainless steel. Further, in order to solve the above problem, a lithium battery has a positive electrode which is produced by the aforementioned methods.

The present invention does not provide a conventional method for producing an active material of lithium nickelate. However, a method for producing a lithium nickelate positive electrode according to the present invention, an active material such as nickel hydroxide or nickel oxyhydroxide includes the steps of: holding a raw material such as nickel hydroxide or nickel oxyhydroxide for an active material in an electrically conductive porous material such as a nickel porous material, a carbon porous material, an aluminum porous material or a stainless steel porous material which is a current collector; subsequently treating the porous material with an alkaline solution of lithium such as a lithium hydroxide solution; and heating the porous material to synthesize lithium nickelate. Incidentally, in the present invention, the heating process is preferably performed at 50° C. to 450° C. A time of the heating process depends on the heating temperature.

In such a method, the porous material is filled with the active material in the condition in which a current collecting structure is formed firmly, a contact condition between the current collector and the active material and a contact condition between active materials are made so good that the active material is charged/discharged homogeneously and, accordingly, the charging/discharging characteristic and charging/discharging cycle performance are improved.

Furthermore, the raw material for the active material can be replaced by lithium nickelate after the raw material is filled directly in the surface and inside of the current collector. Accordingly, it is unnecessary, unlike in the conventional producing method, to make the contact between active materials by a complex process including the steps of: first, separately producing active material powder once by synthesis under a high temperature not lower than 500° C.; mixing, in a drying room, the active material powder and an electrically conductive material such as acetylene black powder or the like with a solution of n-methyl-2-pyrrolidone or the like obtained by dissolving a binding agent such as polyvinylidene fluoride or the like, to form paste; applying the paste onto a nickel or aluminum sheet as a current collector; and drying the paste. Accordingly, there is provided an economically excellent method for producing a lithium nickelate positive electrode.

Furthermore, when nickel hydroxide is previously oxidized to nickel oxyhydroxide before treatment with a lithium solution or if nickel hydroxide or nickel oxyhydroxide is made to contain cobalt, performance can be improved. Incidentally, a lithium hydroxide aqueous solution is preferably used as an alkaline solution containing lithium ions.

EXAMPLES

The present invention will be described below in detail on the basis of Examples thereof.

Example 1

Sintered nickel plaque used as a holding substrate for an active material of a sintered type nickel-cadmium battery was used. A so-called vacuum impregnation method used widely as a method for producing a nickel hydroxide positive electrode of a battery was applied to thus obtained sintered type nickel substrate (using EL 100-mesh nickel net as a core material) having a porosity of about 85% to thereby produce a substrate containing nickel hydroxide.

That is, after 4M nickel nitrate aqueous solution containing 2 mol % [{Co/(Ni+Co)}×100] of cobalt was impregnated at 5 mmHg, the nickel nitrate aqueous solution was neutralized with 5M sodium hydroxide aqueous solution and washed with hot water. Then, drying at 100° C. was made. Such a conventionally well-known operation was repeated three times to thereby produce an electrode filled with nickel hydroxide.

Successively, the electrode was immersed in a 0.1M sodium hydroxide aqueous solution and anodic oxidation was performed on the anode at a current density of 5 mA/cm$^2$ for 3 hours while using two nickel plates as counter electrodes to thereby change nickel hydroxide to nickel oxyhydroxide.

Then, the electrode was immersed in a 1M lithium hydroxide solution kept at 80° C. for 1 hour, and further, heated at 400° C. in air for 1 hour to thereby produce a positive electrode A having a size of 30 mm×40 mm×0.8 mm and a nominal capacity of 200 mAh according to the present invention.

Example 2

4M nickel nitrate aqueous solution containing 2 mol % [{Co/(Ni+Co)}×100] of cobalt was impregnated at 5 mmHg in a sinter type nickel substrate (using a 100-mesh nickel net as a core material) of about 85% porosity obtained by sintering carbonyl nickel powder, and then the nickel nitrate aqueous solution was neutralized with 5M sodium hydroxide aqueous solution and washed with hot water. Then, drying at 100° C. was made. Such a conventionally well-known operation was repeated three times to thereby produce an electrode plate filled with nickel hydroxide.

Successively, the electrode was immersed in a 0.1M sodium hydroxide aqueous solution containing potassium peroxodisulfate dissolved therein to thereby change nickel hydroxide to nickel oxyhydroxide.

Then, the electrode was immersed in a 1M lithium hydroxide solution kept at 80° C. for 1 hour and further heated in air at 400° C. for 3 hours to thereby produce a positive electrode B having a size of 30 mm×40 mm×0.8 mm and a nominal capacity of 200 mAh according to the present invention.

Example 3

In this Example, foamed nickel (tradename: CERMET produced by Sumitomo Electric Industries, Ltd.) of 98% porosity was used as a substrate. After the foamed nickel was filled with mixture paste of 15 ml of a 0.1 wt % carboxyl methylcellulose aqueous solution and 20 parts of 20 μm nickel oxyhydroxide powder containing 2 mol % [{Co/(Ni+Co)}×100] of cobalt, thus obtained substrate was dried at 100° C. to thereby produce an electrode filled with nickel oxyhydroxide.

Then, the electrode was immersed in a 1M lithium hydroxide solution kept at 80° C. for 1 hour, and further heated in air at 400° C. for 1 hour to thereby produce a positive electrode C having a size of 30 mm×40 mm×0.8 mm and a nominal capacity of 200 mAh according to the present invention.

Comparative Example

As a comparative example, a positive electrode was produced by a conventional method. That is, nickel oxyhydroxide powder containing 2 mol % [{Co/(Ni+Co)}×100] of cobalt was mixed with the same equivalent of lithium nitrate powder, and the mixture was heated in an air atmosphere at 450° C. for 10 hours so that an active material was obtained through synthesization of lithium nickelate. After the active material was then mixed with an n-methyl-2-pyrrolidone solution containing 1% of polyvinylidene difluoride, the mixture was applied onto an aluminum sheet and dried at 100° C. to thereby produce a positive electrode D having a size of 30 mm×40 mm×0.8 mm and a nominal capacity of 200 mAh.

A test battery containing each of the positive electrodes A, B, C and D was produced in the following manner. That is, a test battery was produced by using one positive electrode plate A, B, C or D, two metallic lithium electrodes each having the same size as that of the positive electrode plate and 300 ml of an ethylene carbonate-diethyl carbonate mixture solution containing 1M lithium chlorate as an electrolyte. Incidentally, a reference electrode of metal lithium was used for measuring the potential of the positive electrode.

FIG. 1 shows discharging characteristic when these battery were discharged at 40 mA after charged to 4.3 V (counter to metal lithium) at 10 mA at 20° C.

Figure 2:
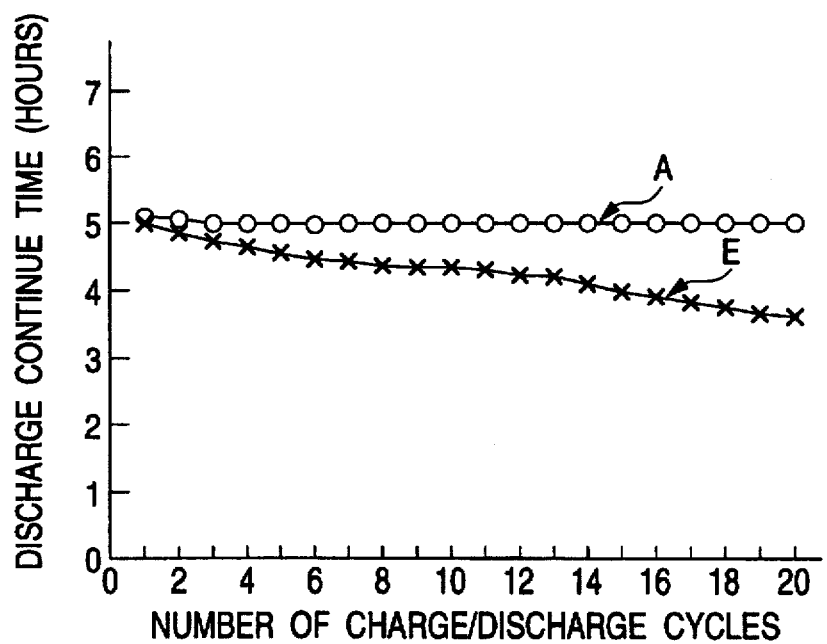
FIG. 2 is a graph showing the effect of addition of cobalt and showing the relation between the number of charging/discharging cycles and the discharging capacity of the positive electrode according to the present invention.

It is apparent from FIG. 1 that the discharging performance of the positive electrodes A, B and C according to the present invention is superior to that of the conventional positive electrode D. That is, when lithium nickelate is synthesized in the condition where a substrate excellent in current collecting characteristic is used and a raw material for an active material is held, the discharge performance of the positive electrode can be improved. Further, a positive electrode E was produced in the same manner as in Embodiment 1 except that the cobalt content was 0 mol %, that is, the active material containing no cobalt was used. FIG. 2 shows the change of the discharging capacity with the repetition of the charging/discharging cycle in the case where the positive electrodes A and E are charged/discharged in the same condition as in FIG. 1. It is apparent from FIG. 2 that the initial capacity of the positive electrode A is nearly equal to that of the positive electrode E but the lowering of the capacity of the positive electrode A containing cobalt is less than the lowering of the capacity of the positive electrode E without containing any cobalt with the repetition of the charging/discharging cycle.

Accordingly, it is apparent that the addition of cobalt is effective even in the case where a substrate excellent in current collecting characteristic is used as shown in the present invention. The cobalt content is preferably in a range of from 2 to 90 mol %, but the cost thereof is undesirably increased if the cobalt content is larger than 50 mol %. That is, preferably, the cobalt content is in a range of from 2 to 50 mol % in the present invention. With respect to the effect of cobalt, it seems that not only $LiNiO_2$ and $LiCo_2$ as active materials form a solid solution to thereby make it possible to maintain the activity of the active material but also the containing of cobalt facilitates the diffusion of lithium ions of lithium nickelate to thereby make the active material react homogeneously. Consequently, it is considered that performance is improved. In this occasion, it is advantageous that cobalt contained in nickel hydroxide or nickel oxyhydroxide as a raw material is used in combination with cobalt hydroxide or cobalt oxyhydroxide to form a solid solution.

As described above, the reason why the performance of the positive electrode according to the present invention is excellent can be considered as follows. After a porous material of nickel or the like serving as an active material holding body and as a current collector is directly filled with a raw material, the active material of the positive electrode according to the present invention is synthesized as it is and held in the porous material. Accordingly, not only the electrical contact between the active material and the current collector is good, but also the adhesion condition between lithium nickelate particles as the active material is good. Furthermore, the contact resistance between particles is small, and the diffusion of lithium ions which is the rate determining process of reaction is made homogeneously between particles.

In addition, the same effect is obtained also when stainless steel is used as a material for the active material holding substrate, though the Examples have been described upon the case where nickel is used as the material. However, if aluminum or carbon is used as the material, heating may be preferably made under an environment smaller in the oxygen content than the air atmosphere and under a low temperature not higher than 350° C. after the electrode is filled with nickel hydroxide or nickel oxyhydroxide because heating under an atmosphere containing oxygen brings a tendency of formation of a thick oxide film layer on the surface of aluminum or carbon to thereby cause lowering of the mechanical strength of the electrode or lowering of the electric conductivity of the electrode.

As nickel oxyhydroxide, any material may be selected from β type, γ type, or a mixture thereof. Particularly in the case of aluminum, nickel oxyhydroxide containing a small amount of γ-NiOOH, preferably β-NiOOH without any crystal water is used as the nickel oxyhydroxide because hydroxide containing water is formed. Although lithium nickelate can be synthesized at a temperature not higher than 450° C., particularly even at a low temperature not higher than 100° C. in the case where nickel oxyhydroxide is used as a raw material, the change to lithium nickelate is not sufficient in the case where nickel hydroxide is used as the raw material. Accordingly, it was better that the raw material contained nickel oxyhydroxide. It is presumed that lithium nickelate which is an active material is generated according to the following formula by the ion exchange reaction of protons of nickel oxyhydroxide with lithium ions of the lithium alkaline solution. This reaction has a tendency to be accelerated by addition of cobalt.

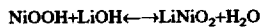

$$NiOOH + LiOH \leftarrow \rightarrow LiNiO_2 + H_2O$$

Even in the case where nickel is used as a material, a thick oxide film is formed on the surface of the nickel substrate if the heating temperature is higher than 410° C. under an air atmosphere. Accordingly, the heating temperature is preferably selected to be not higher than 400° C. Incidentally, in the present invention, the heating temperature is generally not lower than 50° C.

To suppress the formation of such an oxide film, it could be confirmed that, as reported in Japanese Patent Application Unexamined Publication (kokai) No. Sho. 55-64372, the lowering of strength of the nickel substrate caused by heating under an atmosphere containing oxygen was suppressed effectively when a technique of forming a thin and uniform nickel oxide film on the surface of the nickel substrate of sintered type nickel-cadmium by heating under an atmosphere containing air or oxygen was applied to the present invention to suppress the corrosion of the nickel substrate at the time of impregnation process. Although the above description has been made about the performance of the positive electrode according to the present invention in the case of a non-aqueous solution battery such as lithium system using metallic lithium of negative active material and lithium system using lithium intercalation negative active material, the positive electrode according to the present invention can be also applied to an aqueous solution type battery, for example, a battery using an electrolyte containing lithium ions such as a lithium nitrate aqueous solution or the like, whether primary battery or secondary battery. In this case, nickel is preferably used as a material for the substrate.

What is claimed is:

1. A method for producing a lithium nickelate positive electrode comprising the steps of:

holding a material comprising one selected from the group consisting of nickel hydroxide and nickel oxyhydroxide into an electrically conductive porous substrate to form an electrode;

treating said electrode with an alkaline solution containing lithium; and heating said electrode treated with the alkaline solution.

2. The method according to claim 1, wherein said material contains cobalt.

3. The method according to claim 1, wherein said electrically conductive porous substrate comprises one selected from the group consisting of nickel, carbon, aluminum and stainless steel.

4. The method according to claim 1, wherein said alkaline solution contains lithium ion.

5. The method according to claim 4, wherein said alkaline solution is lithium hydroxide aqueous solution.

6. The method according to claim 2, wherein the material contains cobalt in the range of 2 to 90 mol %.

7. The method according to claim 6, wherein the material contains cobalt in the range of 2 to 50 mol %.

8. The method according to claim 3, wherein said electrically conductive porous substrate comprises one selected from the group consisting of carbon and aluminum, and said heating step is performed in an environment smaller in the oxygen content than the air atmosphere and at a temperature not higher than 350° C.

9. The method according to claim 1, wherein said nickel oxyhydroxide comprises β-NiOOH.

10. The method according to claim 1, wherein said material comprises nickel oxyhydroxide, and said heating step is performed at a temperature not higher than 450° C.

11. The method according to claim 10, wherein said heating step is performed at a temperature not higher than 100° C.

12. The method according to claim 3, wherein said electrically conductive porous substrate comprises nickel, and said heating step is performed at a temperature not higher than 400° C.

13. The method according to claim 1, wherein said treating step comprises the step of: immersing said electrode into said alkaline solution.

14. The method according to claim 1, wherein said heating step is performed at a temperature not higher than 450° C.

15. A lithium ion battery comprising a lithium nickelate positive electrode produced by a process comprising the steps of:

holding a material comprising one selected from the group consisting of nickel hydroxide and nickel oxyhydroxide into an electrically conductive porous substrate to form an electrode;

treating said electrode with an alkaline solution containing lithium ion; and heating said electrode treated with the alkaline solution.

16. The lithium ion battery according to claim 15, wherein said material contains cobalt.

17. The lithium ion battery according to claim 15, wherein said electrically conductive porous body comprises one selected from the group consisting of nickel, carbon, aluminum and stainless steel.

18. The lithium ion battery according to claim 15, wherein said alkaline solution contains lithium ion.

19. The lithium ion battery according to claim 16, wherein said alkaline solution is lithium hydroxide aqueous solution.

20. The lithium ion battery according to claim 15, wherein the material contains cobalt in the range of 2 to 90 mol %.

21. The lithium ion battery according to claim 17, wherein the material contains cobalt in the range of 2 to 50 mol %.

22. The lithium ion battery according to claim 15, wherein said electrically conductive porous substrate comprises one selected from the group consisting of carbon and aluminum, and said heating step is performed in an environment smaller in the oxygen content than the air atmosphere and at a temperature not higher than 350° C.

23. The lithium ion battery according to claim 15, wherein said nickel oxyhydroxide comprises β-NiOOH.

24. The lithium ion battery according to claim 15, wherein said material comprises nickel oxyhydroxide, and said heating step is performed at a temperature not higher than 450° C.

25. The lithium ion battery according to claim 24, wherein said heating step is performed at a temperature not higher than 100° C.

26. The lithium ion battery according to claim 17, wherein said electrically conductive porous substrate comprises nickel, and said heating step is performed at a temperature not higher than 400° C.

27. The lithium ion battery according to claim 15, wherein said treating step comprises the step of: immersing said electrode plate into said alkaline solution.

28. The lithium ion battery according to claim 15, wherein said heating step is performed at a temperature not higher than 450° C.

* * * * *